United States Patent
Walrand et al.

(10) Patent No.: US 12,030,244 B2
(45) Date of Patent: Jul. 9, 2024

(54) APPARATUS AND METHOD FOR MANUFACTURING A THREE-DIMENSIONAL OBJECT

(71) Applicant: AddUp, Cebazat (FR)

(72) Inventors: Gilles Walrand, Cebazat (FR); Franck Denavit, Cebazat (FR)

(73) Assignee: ADDUP, Cebazat (FR)

( * ) Notice: Subject to any disclaimer, the term of this patent is extended or adjusted under 35 U.S.C. 154(b) by 825 days.

(21) Appl. No.: 17/050,250

(22) PCT Filed: Apr. 19, 2019

(86) PCT No.: PCT/FR2019/050942
§ 371 (c)(1),
(2) Date: Oct. 23, 2020

(87) PCT Pub. No.: WO2019/207239
PCT Pub. Date: Oct. 31, 2019

(65) Prior Publication Data
US 2021/0178481 A1    Jun. 17, 2021

(30) Foreign Application Priority Data
Apr. 23, 2018 (FR) .................................. 1853547

(51) Int. Cl.
*B29C 64/153* (2017.01)
*B22F 10/28* (2021.01)
(Continued)

(52) U.S. Cl.
CPC ............ *B29C 64/153* (2017.08); *B22F 10/28* (2021.01); *B22F 10/36* (2021.01); *B22F 10/366* (2021.01);
(Continued)

(58) Field of Classification Search
CPC .............. B23K 26/0643; B23K 26/354; B23K 26/082; B22F 10/28; B22F 12/44
See application file for complete search history.

(56) References Cited

U.S. PATENT DOCUMENTS

| 5,393,482 A | 2/1995 | Benda et al. |
| 5,508,489 A | 4/1996 | Benda et al. |

(Continued)

FOREIGN PATENT DOCUMENTS

| CN | 106092979 A | * 11/2016 | ........... G01N 21/645 |
| JP | 2017-42808 A | 3/2017 | |

(Continued)

OTHER PUBLICATIONS

International Search Report dated Jul. 31, 2019, in corresponding PCT/FR2019/050942 (4 pages).

*Primary Examiner* — Thien S Tran
(74) *Attorney, Agent, or Firm* — VENABLE LLP

(57) ABSTRACT

An apparatus for manufacturing a three-dimensional object by selective additive manufacturing comprises: a support (140) suitable for supporting at least one layer (150) of additive manufacturing powder, a laser source (110) suitable for emitting a laser beam (111), a scanning device (130) suitable for directing the laser beam onto the powder layer so as to scan at least a portion of the powder layer, and a device (120) for modulating the scanning trajectory, arranged upstream of the scanning device, the modulating device comprising a modulating mirror (121) suitable for reflecting the laser beam emitted by the laser source and for directing it towards the scanning device, the angle of incidence of the laser beam emitted by the laser source on the modulating mirror being between 20 and 45°.

16 Claims, 5 Drawing Sheets

(51) Int. Cl.
  *B22F 10/36*   (2021.01)
  *B22F 10/366*  (2021.01)
  *B22F 10/85*   (2021.01)
  *B22F 12/41*   (2021.01)
  *B22F 12/44*   (2021.01)
  *B22F 12/45*   (2021.01)
  *B22F 12/49*   (2021.01)
  *B22F 12/90*   (2021.01)
  *B23K 26/06*   (2014.01)
  *B23K 26/082*  (2014.01)
  *B23K 26/354*  (2014.01)
  *B28B 1/00*    (2006.01)
  *B33Y 10/00*   (2015.01)
  *B33Y 30/00*   (2015.01)
  *B33Y 50/02*   (2015.01)

(52) U.S. Cl.
  CPC .............. *B22F 10/85* (2021.01); *B22F 12/44* (2021.01); *B22F 12/49* (2021.01); *B22F 12/90* (2021.01); *B23K 26/0643* (2013.01); *B23K 26/082* (2015.10); *B23K 26/354* (2015.10); *B28B 1/001* (2013.01); *B22F 12/41* (2021.01); *B22F 12/45* (2021.01); *B33Y 10/00* (2014.12); *B33Y 30/00* (2014.12); *B33Y 50/02* (2014.12)

(56) References Cited

U.S. PATENT DOCUMENTS

| | | |
|---|---|---|
| 10,926,336 B2 | 2/2021 | Walrand et al. |
| 2007/0023079 A1* | 2/2007 | Mills ................. G02B 5/208 |
| | | 136/246 |
| 2009/0135460 A1 | 5/2009 | Kim |
| 2010/0284088 A1* | 11/2010 | Zambov ............. G02B 5/285 |
| | | 427/163.1 |
| 2011/0299147 A1 | 12/2011 | Kim |
| 2017/0173876 A1* | 6/2017 | Lissotschenko ........ B22F 10/20 |
| 2018/0154443 A1* | 6/2018 | Milshtein ............ B23K 26/0626 |
| 2018/0246321 A1* | 8/2018 | Campton .............. B22F 10/28 |

FOREIGN PATENT DOCUMENTS

| | | |
|---|---|---|
| JP | 2017-148829 A | 8/2017 |
| WO | 2016/156824 A1 | 10/2016 |
| WO | WO-2017051168 A1 * | 3/2017 ........... B22F 3/1055 |

* cited by examiner

——— 305
- - - - - 306

—————— 405
- - - - - - - 406

APPARATUS AND METHOD FOR MANUFACTURING A THREE-DIMENSIONAL OBJECT

TECHNICAL FIELD

The invention concerns the technical field of selective additive manufacturing.

PRIOR ART

Selective additive manufacturing consists of producing three-dimensional objects by consolidation of selected zones on successive strata of powdery material (metal powder, ceramic powder etc.). The consolidated zones correspond to successive sections of the three-dimensional object. Consolidation takes place layer by layer, by total or partial selective fusion performed with a consolidation source. This source is conventionally a radiation source (for example a high-power laser beam) or a particle beam source (for example an electron beam, known as EBM or electron beam melting in the terminology generally used in this field).

However, conventional additive manufacturing machines have a productivity rate which is today considered insufficient.

In order to increase the productivity of additive manufacturing equipment, the number of laser sources may be increased. However, this has several drawbacks. The efficacy of such a system is limited. The presence of different laser sources poses problems of space. Also, the multiplication of laser sources entails a significant cost.

SUMMARY OF INVENTION

It is an object of the invention to alleviate at least one of the drawbacks presented above.

To this end, an apparatus is provided for manufacturing a three-dimensional object by selective additive manufacturing, comprising:
- a support suitable for supporting at least one layer of additive manufacturing powder,
- a laser source suitable for emitting a laser beam,
- a scanning device suitable for directing the laser beam onto the powder layer so as to scan at least a portion of the powder layer,
- a device for modulating the scanning trajectory, arranged upstream of the scanning device, the modulating device comprising a modulating mirror suitable for reflecting the laser beam emitted by the laser source and for directing it towards the scanning device, the angle of incidence of the laser beam emitted by the laser source on the modulating mirror being between 20 and 45°.

Advantageously, the invention is supplemented by the following characteristics taken alone or in any of their technically feasible combinations:
- the scanning device comprises a first scanning mirror and/or a second scanning mirror, the scanning device being suitable for modifying the orientation of the first scanning mirror with respect to a first scanning rotational axis and/or of the second scanning mirror with respect to a second scanning rotational axis,
- the modulating device is suitable for modifying the orientation of the modulating mirror with respect to a first modulation rotational axis and/or a second modulation rotational axis,
- the scanning device is suitable for modifying the orientation of the first scanning mirror with respect to the first scanning rotational axis over a first range of scanning angle values, and/or of the second scanning mirror with respect to the second scanning rotational axis over a second range of scanning angle values,
- the modulating device is suitable for modifying the orientation of the modulating mirror with respect to a first modulation rotational axis over a first range of modulation angle values and/or the second modulation rotational axis over a second range of modulation angle values,
- the first and/or second range(s) of scanning angle values are wider than the first and/or second range(s) of modulation angle values,
- the scanning device is configured for modifying the orientation of the first scanning mirror with respect to the first scanning rotational axis and/or of the second scanning mirror with respect to the second scanning rotational axis, at a scanning rotational speed,
- wherein the modulating device is configured for modifying the orientation of the modulating mirror with respect to the first modulation rotational axis and/or the second modulation rotational axis, at a modulation rotational speed,
- the scanning rotational speed is lower than the modulation rotational speed,
- the scanning device comprises the first scanning mirror and the second scanning mirror, the first scanning mirror being suitable for reflecting the laser beam output from the modulating mirror and directing it towards the second scanning mirror, the second scanning mirror being suitable for reflecting the laser beam output from the first scanning mirror and directing it onto the layer of additive manufacturing powder, the system being suitable for controlling the orientation of the first scanning mirror with respect to the first scanning rotational axis and of the second mirror with respect to the second scanning rotational axis, in order to control the trajectory of scanning of the powder layer by the laser beam in two degrees of freedom in a plane of the powder layer,
- the modulating device is suitable for modulating the trajectory according to a modulation comprising oscillation at a frequency greater than 1.5 kHz, preferably greater than or equal to 10 kHz,
- the angle of incidence of the laser beam emitted by the laser source on the modulating mirror is between 25 and 35°,
- the angle of incidence of the laser beam emitted by the laser source on the modulating mirror is between 28 and 32°,
- the modulating mirror comprises silicon carbide,
- the modulating mirror is a flat mirror of elliptical shape.

The invention also concerns a method for manufacturing a three-dimensional object by selective additive manufacturing, implemented by means of such an apparatus and comprising the following steps:
- control of the scanning device following a command to scan at least a part of the layer of additive manufacturing powder along a scanning trajectory, and
- at the same time as control of the scanning device, control of the modulating device following a command to modulate the scanning trajectory,
- such that the laser beam follows a modulated scanning trajectory at the level of the powder layer.

The invention is advantageously supplemented by the following characteristics taken alone or in any of their technically feasible combinations:

in the step of controlling the modulating device, the modulating device is controlled so as to modify the orientation of the modulating mirror with respect to the first and/or second modulation rotational axis at a modulation rotational speed, in the step of controlling the scanning device, the scanning device is controlled so as to modify the orientation of the first scanning mirror with respect to the first scanning rotational axis and/or of the second scanning mirror with respect to the second scanning rotational axis, at a scanning rotational speed which is lower than the modulation rotational speed.

BRIEF DESCRIPTION OF THE DRAWINGS

Further aims, characteristics and advantages of the invention will appear from reading the description below which is given merely for illustration and without limitation, with reference to the drawings in which.

DETAILED DESCRIPTION

General Structure of the Apparatus

Figure 1:
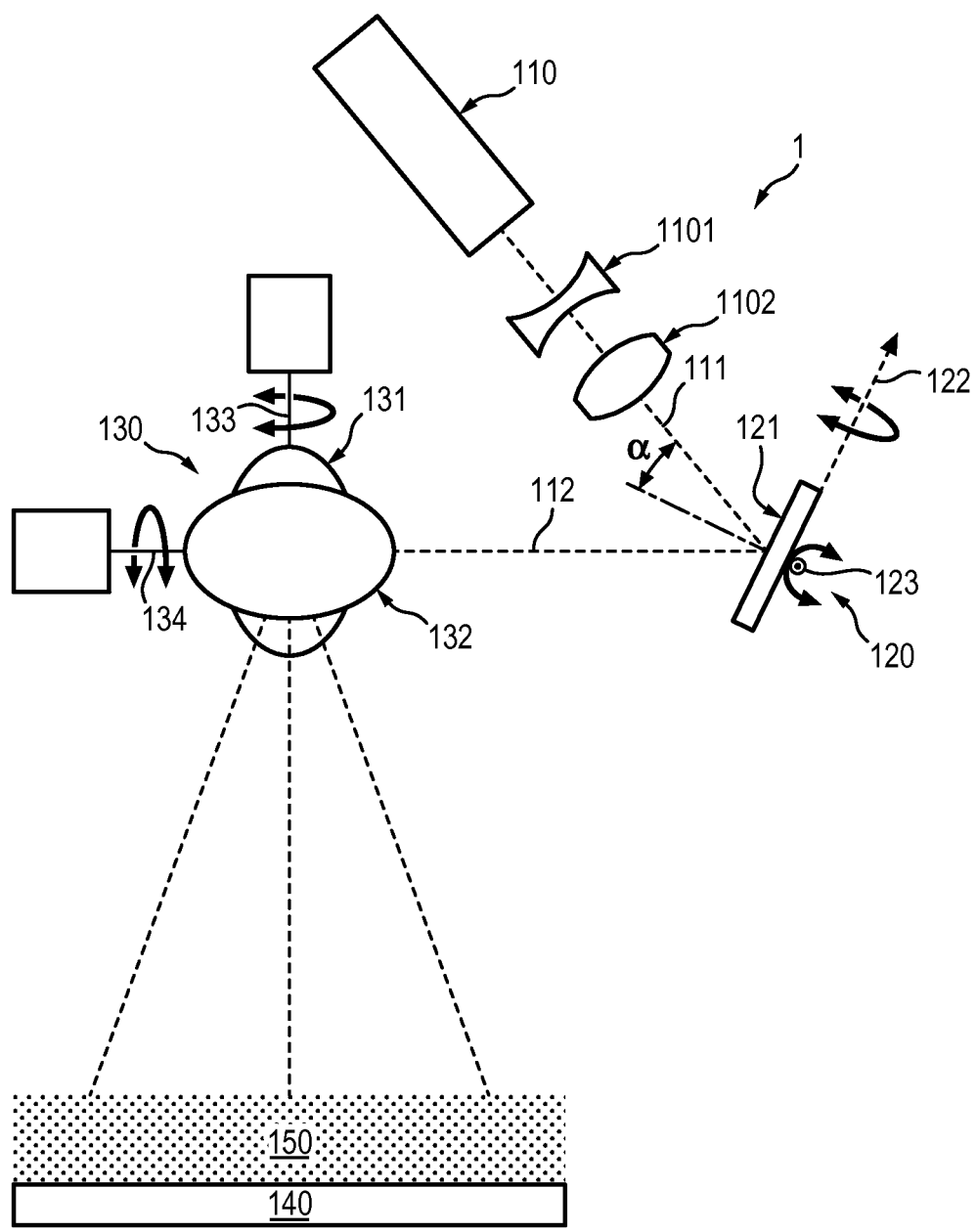
FIG. 1 depicts schematically an apparatus according to an exemplary embodiment of the invention.
Figure 2:
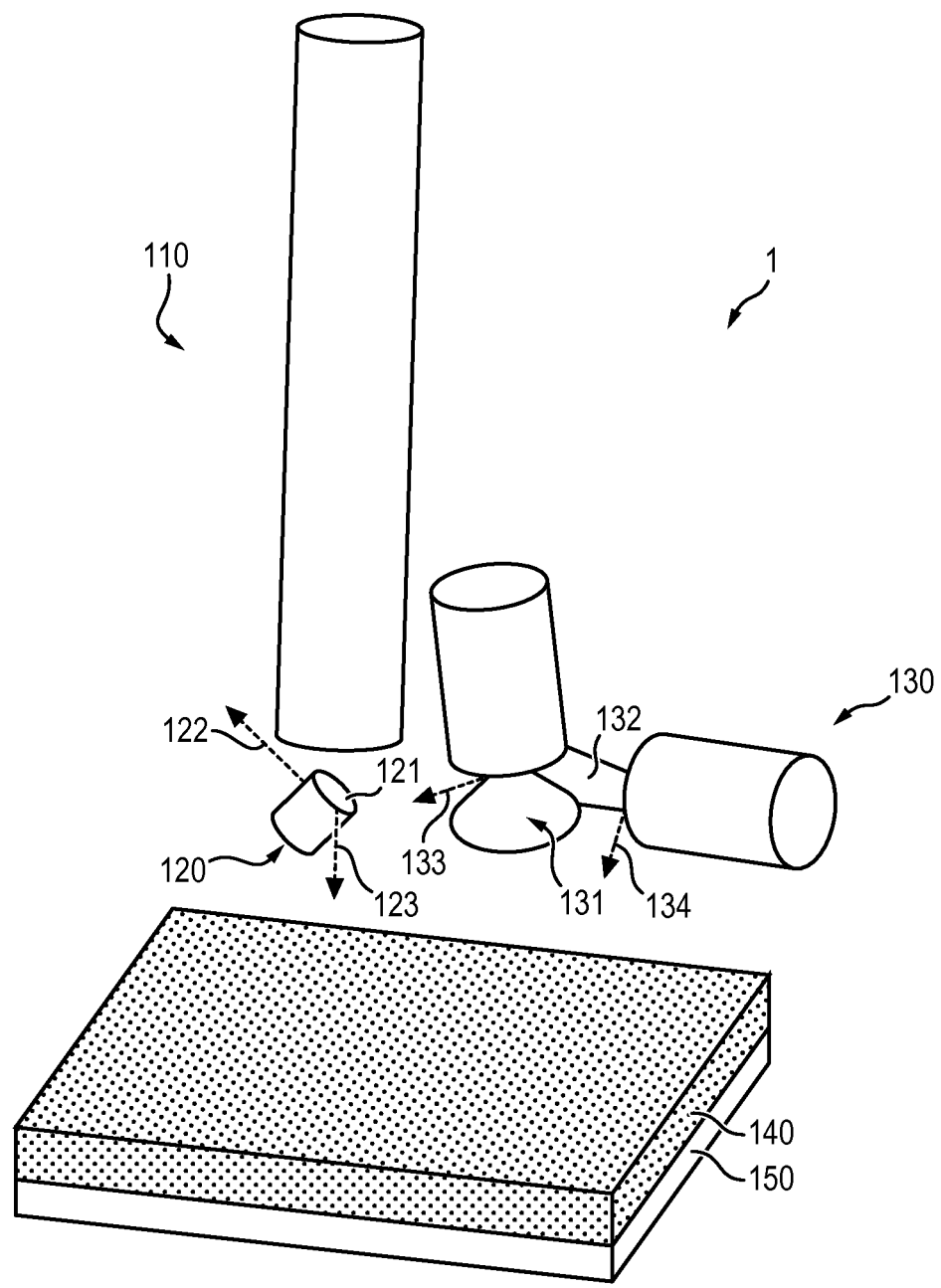
FIG. 2 depicts a perspective view of the apparatus from FIG. 1, FIGS. 3a, 3b, 3c, 4a and 4b depict patterns of trajectories according to an exemplary embodiment of the invention.

With reference to FIGS. 1 and 2, an apparatus 1 is described. The apparatus 1 may be an apparatus 1 for manufacturing an object, for example by additive manufacturing, for example by selective additive manufacturing. The object may be a three-dimensional object.

The apparatus 1 may comprise a support 140. The support 140 may be suitable to support at least one layer 150 of material, for example additive manufacturing material. The layer 150 of material may be a layer 150 of powder, for example of additive manufacturing powder.

The apparatus 1 may comprise a source 110. The source 110 may be a consolidation source. The source 110 may be a radiation source, for example a laser source, for example a laser light source, for example suitable for emitting a laser beam.

The apparatus 1 may comprise a scanning device 130. The scanning device may be suitable for directing the laser beam, for example onto the layer 150, for example so as to scan at least a part of the layer 150, for example along a scanning trajectory.

The apparatus 1 comprises a device 120, for example a modulating device 120, for example a device for modulating the scanning trajectory. The device 120 may be arranged upstream of the scanning device 130. The device 120 may comprise a mirror 121, for example a modulating mirror 121. The mirror 121 may be suitable for reflecting the laser beam emitted by the laser source, and/or for directing it towards the scanning device. The angle α of incidence of the laser beam emitted by the laser source on the mirror 121 is between 20 and 45°, and/or the angle formed between the laser beam emitted by the laser source and directed towards the device 120, and the laser beam output from the device 120 and directed towards the scanning device 130, is between 40 and 90°.

The angle of incidence is the angle between the direction of propagation of the laser beam and the normal to the mirror at the level of the mirror surface encountered by the laser beam.

The terms "upstream" and "downstream" mean upstream and downstream relative to the direction of flux of the photons of the laser beam emitted by the laser source, i.e. relative to the optical path of the laser beam. It is thus possible to modulate the main trajectory defined by the scanning device 130 by means of prior modulation, and thus obtain a modulated trajectory.

In effect, modulation of the trajectory allows improvement of the distribution of energy supplied by the laser source, which is reflected by a widening of the melt bath or a wider bead of molten material and a reduction in the number of vectors corresponding to the laser paths, and consequently an increase in the fusion rate, i.e. a larger melted surface area for a same time unit. To obtain a correct fusion, a material needs a quantity of energy per time unit, called fluence, which is expressed for example in $J/mm^2$. If the fluence is too low, fusion is not complete and the material will not have the required characteristics. If the fluence is too great, generally at the centre of the laser spot, the melt bath will be too dynamic, which will lead to undesirable phenomena such as splashes, sparks, significant smoke disrupting the laser beam, or bubbling. Such undesirable phenomena degrade the quality of the resulting material. Thus for a given diameter of the laser spot, the laser energy and fusion rate—and hence the productivity—are limited in the prior art. Thanks to a modulating device which does not adversely affect compactness and efficacy, the invention allows the introduction of modulations allowing a second trajectory to be superposed on the main trajectory onto the powder bath.

It is thus possible to avoid the limitations inherent in a localised laser spot and a rectilinear trajectory by introducing modulations into the trajectory.

The apparatus thus allows an increase in the efficiency of the energy transfer to the material. Indeed, since the power of a laser beam is highly localised, material such as powder melts rapidly and the resulting melt bath acts as a mirror with respect to the photons. The result is a significant re-emission of the energy supplied in this context.

It is thus possible to obtain a more effective solution which remains simple to implement while limiting the associated costs.

In contrast to the addition of multiple laser sources, it is possible to limit the costs linked both to obtaining laser sources and to the power necessary for their use.

Modulation of the trajectory also allows better control of the cooling dynamics of the melt bath, and hence improvement in the state, in particular the metallurgical state in the case of a metal, of the formed material.

Furthermore, by the choice of modulation pattern, modulation allows control of the quantity of energy deposited over the width of the melt bath so as to adjust the energy, for example between the edges and centre of the melt bath or between one edge, the centre and another edge, so as to limit the undesirable phenomena such as splashes and/or sparks.

Also, it is possible to obtain an effective and compact device by the choice of the relative arrangement between the source, modulation device and scanning device.

In fact, the apparatus is particularly compact in comparison with a solution with several laser sources. The claimed arrangement requires only a single laser and is particularly compact, without a reduction of quality in terms of additive manufacturing.

In particular, such a choice of angle allows reduction of the reflection zone and hence a reduction in the dimensions of the modulating mirror and hence its inertia. It is thus possible to achieve high oscillation frequencies, for example greater than 1.5 kHz, and hence to increase the efficacy of the modulating device.

Also, such an apparatus may be obtained by modifying existing equipment without the need for extensive modification of the scanning device, for example without interfering in the system for controlling the actuators of the scanning device.

Laser Source

The laser source 110 comprises for example a laser fibre, for example a continuous laser, for example a mono-mode laser with Gaussian energy distribution.

The laser beam may have a power greater than or equal to 250 W, for example greater than or equal to 500 W, for example less than or equal to 5000 W, for example less than or equal to 3000 W, for example between 750 and 2500 W, for example equal to 1000 or 2000 W.

The laser beam may come into contact with the powder layer 150, forming a laser spot or spot. The spot may have a given diameter, for example greater than or equal to 50 or 60 µm, for example less than or equal to 300 or 250 µm, for example between 50 and 250 µm, for example equal to 70 or 150 or 250 µm.

The laser beam used may for example have a wavelength of 1070 nm.

The apparatus 1 may comprise an optical element 1101 for controlling the focal length, for example an optical lens for controlling the focal length, for example arranged at the output from the laser source. The optical element for controlling the focal length may be movable so as to adjust the focal length, for example movable so as to move closer to and/or further away from the laser source 110, for example movable along the axis formed by the laser beam 111 leaving the laser source.

The apparatus 1 may comprise a focusing device 1102 between the optical element for controlling the focal length, for example arranged between the laser source 110 and the modulating device 120.

The apparatus 1 may comprise a device for shaping the laser beam, for example to homogenise the energy delivered to the surface, for example the top surface, of the part of the scanned powder layer, for example so as to obtain a top-hat type or donut type of energy distribution. The shaping device may be or comprise a diffractive lens or a refractive element.

Scanning Device

The scanning device 130 may comprise a first scanning mirror 131 and/or a second scanning mirror 132. The scanning device 130 may thus be suitable for modifying the orientation of the first scanning mirror 131 and/or of the second scanning mirror 132 with respect to one or more rotational axes, for example over a range of scanning angle values. The scanning device 130 may be suitable for modifying the orientation of the first scanning mirror 131 with respect to a first scanning rotational axis 133, for example over a first range of scanning angle values. The scanning device 130 may be suitable for modifying the orientation of the second scanning mirror 132 with respect to a second scanning rotational axis 134, for example over a second range of scanning angle values.

The scanning device 130 may be configured to modify the orientation of the first scanning mirror 131 with respect to the first scanning rotational axis 133 and/or of the second scanning mirror 132 with respect to the second scanning rotational axis 134 at a scanning rotational speed.

The first scanning mirror 131 may be suitable and/or controlled for reflecting the laser beam 112 output from the modulating mirror 121 and directing it towards the second scanning mirror 132. The second scanning mirror 132 may be suitable for reflecting the laser beam output from the first scanning mirror 131 and directing it onto the layer 150. The system may be suitable for controlling the orientation of the first scanning mirror 131 with respect to the first scanning rotational axis 133 and of the second mirror 132 with respect to the second scanning rotational axis 134, in order to control the trajectory of scanning of the layer 150 by the laser beam in two degrees of freedom, for example in a plane of the powder layer, for example in two directions of the plane of the powder layer. The plane of the powder layer may be a plane corresponding to a surface, for example a top surface, of the powder layer.

The scanning device 130 may comprise at least one actuator, for example for modifying the orientation of the first scanning mirror 131 and/or of the second scanning mirror 132. The scanning device 130 may thus comprise a first actuator for modifying the orientation of the first scanning mirror 131 with respect to the first scanning rotational axis 133, and a second actuator for modifying the orientation of the second scanning mirror 132 with respect to the second rotational axis 134.

The first scanning mirror 131 and/or the second scanning mirror 132 may be a flat mirror and/or a shaped mirror, for example in cut shape, elliptical, or rectangular, for example square, or circular.

The scanning device 130 may be suitable for imposing on the laser beam, or directing the laser beam along, a scanning trajectory or main trajectory at the level of at least a part of the layer 150 of additive manufacturing powder. The scanning trajectory or main trajectory corresponds to the path which would be followed by the laser beam in the absence of modulation by the modulating device 120. It thus corresponds to a certain control of the scanning device 130. The definitive trajectory thus depends on the main trajectory and secondary trajectory as described below.

The main trajectory may comprise one or more for example rectilinear portion(s). The portions correspond to portions of the trajectory in which the beam would effectively reach the powder layer 150 in the absence of modulation, thus forming the spot following the portions. The portions form vectors for example.

The trajectory may comprise one or more jump(s) separating two portions, corresponding to portions in which no laser beam would effectively reach the powder layer 150 in the absence of modulation, since at the corresponding moment no laser beam is emitted or reaches the scanning device 130.

At least two portions, for example two successive portions, may be separated by a gap called a vector gap. Successive portions of the main trajectory are for example separated by a same gap. The gap is for example greater than 100 µm, for example greater than 200 µm, for example greater than 400 µm, for example less than 1000 µm, for example less than 700 µm, for example equal to 500 µm. The apparatus comprising the modulating device allows an increase in the vector gap in comparison with the prior art, and hence greater efficiency by reducing the length of the main trajectory and hence the manufacturing time.

The scanning device 130 may comprise a three-axis scanning head. The apparatus 1 may then preferably comprise the optical element for controlling the focal length 1101 and/or the focusing device 1102 described above.

The scanning device 130 may comprise a two-axis scanning head. The apparatus 1 may then preferably comprise a focusing device between the scanning device 130 and the layer 150. The focusing device comprises for example a lens, for example a flat field lens, for example a F-theta lens.

Modulating Device

The modulating device 120 may be suitable for modifying the orientation of the modulating mirror 121, for example by rotation, for example with respect to at least one rotational axis, over a range of modulation angle values. The modulating device 120 may be suitable for modifying the orientation of the modulating mirror 121, for example with respect to a first modulation rotational axis 122, for example over a first range of modulation values. Alternatively or additionally, the modulating device 120 may be suitable for modifying the orientation of the modulating mirror 121 with respect to a second modulation rotational axis 123, for example over a second range of modulation values. The first modulation rotational axis 122 and the second modulation rotational axis 123 may be two orthogonal axes.

The first range of modulation values and/or the second range of modulation values has for example an amplitude of between +/−0.0025 rad and +/−0.0015 rad, for example +/−0.002 rad.

The range of scanning angle values may be wider than the range of modulation angle values. The first and/or second range(s) of scanning angle values may be wider than the first and/or second range(s) of modulation angle values. In fact, modulations are intended to modulate the scanning which determines the main trajectory, for example by imposing a secondary trajectory which is superposed on the main trajectory resulting from the control of the scanning device 130.

The modulating device 120 may be configured to modify the orientation of the modulating mirror 121 with respect to the first modulation rotational axis 122 and/or the second modulation rotational axis 123, at a modulation rotational speed. The scanning rotational speed may be lower than the modulation rotational speed. In fact, the modulating device may thus offer greater reactivity.

The modulating device 120 may comprise at least one actuator, for example for modifying the orientation of the modulating mirror 121. The modulating device 120 may thus comprise a first actuator for modifying the orientation of the modulating mirror with respect to the first modulation rotational axis 122, and a second actuator for modifying the orientation of the modulating mirror with respect to the second modulation rotational axis 123.

The at least one actuator, for example the first actuator and/or the second actuator, may be or comprise a piezoelectric actuator, for example suitable for oscillating at least at an oscillation frequency greater than or equal to 1 kHz, for example greater than 1.5 kHz, for example greater than 2 kHz, for example less than 15 kHz, for example less than 12 kHz, for example between 1.5 and 10 kHz. Such an actuator allows high frequencies to be achieved while remaining compact and low-cost. Also, such an actuator allows great angular precision with respect to the position during modulation, i.e. control of the amplitude, and with respect to the return to a reference position corresponding to an absence of modulation.

The at least one actuator, for example the first actuator and/or the second actuator, may be or comprise an electromagnetic or mechanical actuator.

The at least one actuator, for example the first actuator and/or the second actuator, may be or comprise a microelectromechanical system, also known as MEMS, for example suitable for oscillating at least at an oscillation frequency greater than 10 kHz, for example greater than 15 kHz, for example equal to 20 kHz. Such a high modulation frequency allows an increase in the main scanning speed while retaining a satisfactory pattern density on the layer.

The at least one actuator, for example the first actuator and/or the second actuator, may be or comprise a galvanometer.

The angle $\alpha$ of incidence of the laser beam emitted by the laser source on the mirror 121 may be between 25 and 35°, and/or the angle formed between the laser beam emitted by the laser source and directed towards the device 120, and the laser beam output from the device 120 and directed towards the scanning device 130, may be between 50 and 70°.

The laser beam may have a diameter between 20 and 40 mm when it is reflected on the modulating mirror, for example around 23 mm diameter, and/or a diameter between 50 and 100 µm at the surface of the powder layer.

For an angle $\alpha$ of incidence of 45°, for a laser beam of around 30 mm diameter when reflected on the modulating mirror, the modulating mirror must have an elliptical reflection zone of at least 42 mm length and 30 mm width. However, for an angle of incidence of 30°, the modulating mirror may have an elliptical reflection zone of 35 mm length and 30 mm width. The associated mass is therefore reduced by the order of 18%.

The angle of incidence of the laser beam emitted by the laser source on the modulating mirror may be between 28 and 32°, for example equal to 30°.

The modulating mirror 121 may be a mirror which is for example a flat or shaped mirror, for example in a cut shape or elliptical. Such a shape is particularly suitable for limiting the quantity of material, allowing rapid oscillation without limiting the zone which can be reached by the laser on the surface of the powder layer.

An elliptical mirror for example has a length between $D_f/\cos(\alpha)$ and $2\,D_f/\cos(\alpha)$, where $D_f$ is the diameter of the laser beam and $\alpha$ is the angle of incidence of the laser beam emitted by the laser source on the modulating mirror, for example equal to $1.6\,D_f/\cos(\alpha)$. The mirror has for example a width between $D_f$ and $1.1\,D_f$, for example equal to $D_f$. $D_f$ is for example the diameter of the laser beam at $1/e^2$, or D86 at 86% percent of the energy of a Gaussian spot.

Alternatively, the modulating mirror 121 may be a rectangular mirror, for example square, or a circular mirror.

The modulating mirror 121 may comprise a substrate and a reflective surface coating. Such a coating may improve the reflection of photons on the mirror. Such a coating helps prevent or limit the absorption of energy of the laser beam by the mirror, and prevents or limits the heating of the mirror, wherein heating leads to deformation and reduces the quality of the beam. Such a coating thus allows an extension in the service life of the modulating mirror. The modulating mirror 121 comprises for example silicon carbide. The mirror comprises for example a substrate, the substrate being for example silicon carbide and/or formed substantially from silicon carbide. Silicon carbide offers good performance in terms of mass/rigidity, without having the drawbacks inherent in materials such as beryllium, for example toxicity and difficulty of supply, and costs of supply. It is thus possible to further reduce the mass and hence the inertia of the modulating mirror, and hence further increase the oscillation frequency of the actuator(s) of the modulating device 120.

The modulating device 120 may be suitable for modulating the trajectory according to a modulation. The modulating device 120 may thus be suitable for imposing on the laser beam, or directing the laser beam along, a modulation trajectory or secondary trajectory which is superposed on the main trajectory at the level of at least a part of the layer 150 of additive manufacturing powder.

The modulating mirror 121 may be suitable for oscillating for example with respect to at least one axis, for example two axes, for example with respect to the first modulation rotational axis 122 and/or the second modulation rotational axis 123. The modulating mirror 121 may thus be suitable for oscillating simultaneously and/or independently with respect to two axes, for example the first modulation rotational axis 122 and/or the second modulation rotational axis 123.

The modulating mirror 121 may thus be suitable for oscillating with first oscillations with respect to the first modulation rotational axis 122 and/or with second oscillations with respect to the second modulation rotational axis 123. The modulating mirror 121 may be suitable for oscillating simultaneously with first oscillations with respect to the first modulation rotational axis 122 and with second oscillations with respect to the second modulation rotational axis 123, for example in order to generate a sinusoidal or circular pattern. The oscillations with respect to the first modulation rotational axis 122 and/or the second modulation rotational axis 123 may be controlled in amplitude and/or frequency, for example independently between the two axes 122 and 123.

The oscillations with respect to the first modulation rotational axis 122 may be controlled so as to have a phase offset relative to the oscillations with respect to the second rotational axis 123. Controlling the phase offset for example allows adjustment of the shape of the pattern, changing of the shape of the pattern and/or orientation of the pattern with respect to the scanning direction.

The oscillations allow for example resultant oscillations, for example specific to the secondary trajectory, at the level of the powder layer 150, of amplitude greater than 100 µm, for example greater than 200 µm, for example less than 2000 µm, for example less than 1000 µm, for example less than 750 µm, for example equal to 500 µm. The oscillations may allow an increase in the width of the melt bath for a same spot movement speed and same fluence. It is thus possible to increase the vector gap and hence the specific surface productivity proportionally.

The modulating mirror may be suitable for oscillating at a frequency greater than 1.5 kHz, preferably greater than 2.5 kHz, preferably greater than or equal to 10 kHz, for example with respect to the first modulation rotational axis 122 and/or the second modulation rotational axis 123. The modulation may comprise a pattern, for example a periodic pattern, for example repeated at a frequency greater than 1.5 kHz, preferably greater than 2.5 kHz, preferably greater than or equal to 10 kHz. The pattern is for example an oscillation. The modulation may form a pattern. It is thus possible to introduce modulations using the modulating device.

The secondary trajectory may comprise a pattern, for example so that a pattern can be superposed on the main trajectory at the surface of the part of the powder layer.

Figure 3A:
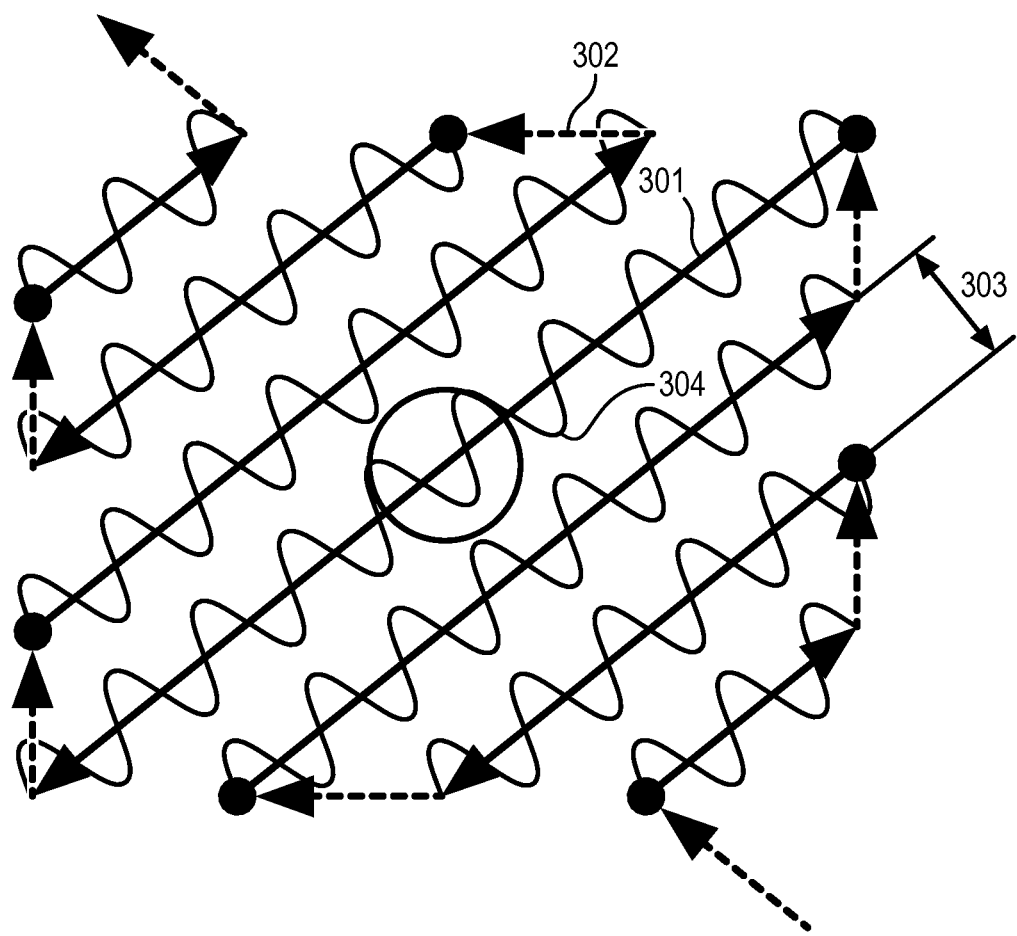
Figure 3B:
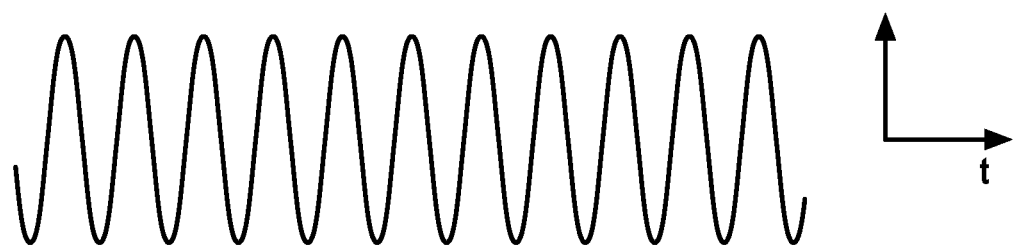
Figure 3C:
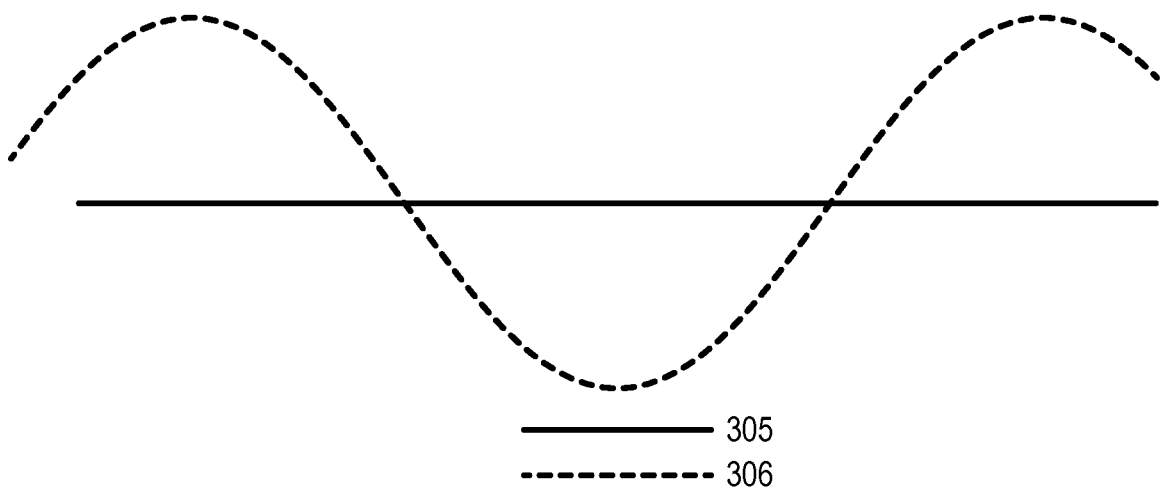

With reference to FIGS. 3a to 3c, an exemplary pattern is illustrated. The pattern is a sinusoid.

On FIG. 3a, the bold elements represent the main trajectory comprising portions 301 separated by a gap 303 and jumps 302, while the elements in fine lines represent the modulated trajectory after superposition of the secondary trajectory, so as to present sinusoidal oscillations through which the laser spot 304 passes.

On FIG. 3b, the secondary trajectory or corresponding modulation trajectory is shown as a variation along an axis as a function of time.

FIG. 3c shows in detail the secondary trajectory between the control associated with the first modulation rotational axis 305 and the control associated with the second modulation rotational axis 306, as a function of time. In the example, the modulating mirror oscillates solely about the second modulation rotational axis.

Figure 4A:
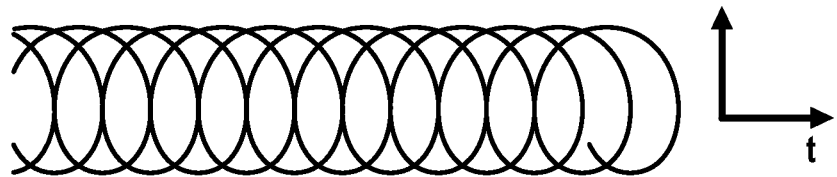
Figure 4B:
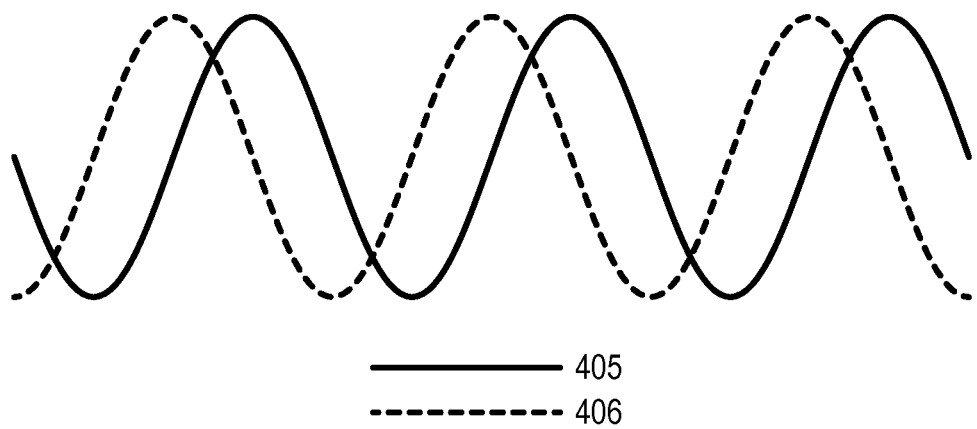

With reference to FIGS. 4a and 4b, an exemplary pattern is illustrated. The pattern is circular.

On FIG. 4a, the second trajectory or corresponding modulation trajectory is shown as a variation along an axis as a function of time.

FIG. 4b shows in detail the secondary trajectory between the control associated with the first modulation rotational axis 405 and the control associated with the second modulation rotational axis 406, as a function of time. In the example, the modulating mirror oscillates both about the first modulation rotational axis and about the second modulation rotational axis.

The laser source 110, the modulating device 120 and the scanning device 130 are for example arranged so as to allow a surface fusion rate, i.e. the surface area of the powder layer covered by the laser spot per unit of time, which is greater than 1000 cm$^2$/min, for example greater than 2000 cm$^2$/min, for example greater than 4000 cm$^2$/min, for example less than 15,000 cm$^2$/min, for example less than 10,000 cm$^2$/min, for example of the order of 6000 cm$^2$/min. Because of the presence of the modulating device, the apparatus according to the invention allows a drastic increase in the surface fusion rate and hence the specific surface productivity.

The modulating device 120 and the scanning device 130 are for example arranged so as to allow the movement speed of the laser spot to be between 0.5 and 10 m/s, for example between 1 and 5 m/s, for example equal to 1 or 2 m/s.

The modulating mirror 121 may be arranged at the level of a convergent part of the laser beam emitted by the laser source 110, for example downstream of the focusing device 1102 when the scanning device 130 comprises a three-axis scanning head. It is thus possible to limit the disruption of the quality of the laser beam. In fact, the laser beam leaving the optical element for controlling the focal length 1101 is divergent and only becomes convergent after leaving the focusing device 1102. Placing the modulating device 120 elsewhere, in particular further upstream, would risk disrupting the optical function by decentring the laser beam.

Layer and Support

The support comprises for example a plate intended to be moved as layers are added.

The or each powder layer 150 has for example a thickness of between 10 and 100 µm, for example between 20 and 60 µm, for example equal to 40 µm.

The material of the or each powder layer 150 has for example a fluence of between 0.5 and 10 J/mm$^2$, for example between 1 and 5 J/mm$^2$, for example equal to 2 J/mm$^2$.

The material of the or each powder layer 150 may comprise titanium and/or aluminium and/or Inconel and/or stainless steel and/or maraging steel. The material of the or each powder layer 150 may consist of titanium and/or aluminium and/or Inconel and/or stainless steel and/or maraging steel.

Other Source

As well as the laser source 110, the apparatus may comprise a second source. The second source may be a particle beam source, for example an electron beam source, for example an electron beam melting source (in the terminology generally used in the field), for example an electron gun.

The apparatus 1 may thus be a hybrid apparatus comprising several energy sources in order to achieve selective fusion. The second source may form a primary energy source suitable for performing selective fusion in the core of the object. The laser source 110 may form a secondary energy source suitable for performing selective fusion at the peripheral zones, for example in the skin or at the edge of the object.

In this way, it is possible to obtain an object with mechanical or metallographic properties which differ at the level of its periphery and in its volume.

The apparatus 1 may also comprise one or more other laser sources 110, for example such as the laser source described above. One or more other laser sources 110, for example each other laser source 110, may be equipped with a scanning device 130, for example a scanning device 130 as described above, and/or a modulating device 120, for example a modulating device 120 as described above. It is thus possible to manufacture large components via a large support and large powder layers, using several laser sources and/or scanning devices and/or modulating devices in parallel in order to treat the different zones of the powder layer or layers.

Control Means

The apparatus 1 may comprise control means suitable for controlling the apparatus, for example for controlling the laser source 110 and/or the modulating device 120 and/or the scanning device 130.

The control means comprise or form a control unit for example.

The control means comprise for example data storage means, for example a data storage unit, for example a RAM memory and/or a ROM memory. The storage means may be suitable for storing instructions corresponding to the method described below.

The control means comprise for example calculation means, for example a processor.

The control means may be configured to implement a method as described below.

Method

Figure 5:
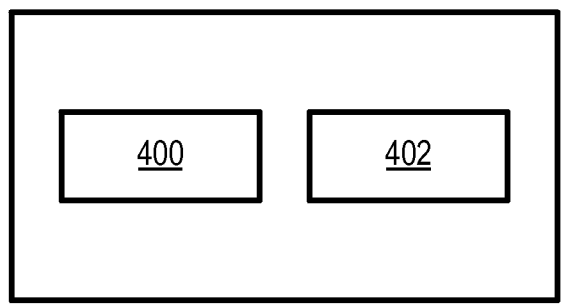
FIG. 5 depicts a method according to an exemplary embodiment of the invention.

With reference to FIG. 5, a method is described for manufacturing a three-dimensional object by a selective additive manufacturing process.

The method may be implemented by means of the apparatus 1.

The method may comprise a step 400 of controlling the scanning device 130 following a command to scan at least a part of a layer 150 of additive manufacturing powder along the scanning trajectory or main trajectory.

The method may comprise a step 402, implemented at the same time as control of the scanning device in step 400, for controlling the modulating device 120 following a command to modulate the scanning trajectory. The command to modulate the scanning trajectory corresponds for example to the second trajectory or modulation trajectory.

Steps 400 and 402 may be implemented such that the laser beam follows a modulated scanning trajectory at the level of the powder layer 150. The modulated scanning trajectory may correspond to superposition of the modulation trajectory on the scanning trajectory.

In the step 400 of controlling the scanning device 130, the scanning device may be controlled so as to modify the orientation of the first scanning mirror 131 and/or the second scanning mirror 132 with respect to the first scanning rotational axis 134, at a scanning rotational speed. In the step 402 of controlling the modulating device 120, the modulating device 120 may be controlled so as to modify the orientation of the modulating mirror 121 with respect to the first modulation rotational axis 122 and/or the second modulation rotational axis 123, at the modulation rotational speed. The scanning rotational speed may be lower than the modulation rotational speed.

Detailed Examples

For a spot diameter of 70 µm, a spot movement speed of 2 m/s, a layer thickness of 40 µm and a fluence of 2 J/mm$^2$, an exemplary apparatus according to the prior art with no modulating device 120 would require a gap of 50 µm and be limited to a laser power of 200 W, such that it would achieve a surface fusion rate of 600 cm$^2$/min, whereas an exemplary apparatus such as the apparatus described which comprises the modulating device 120 may for example allow a gap of 500 µm and an oscillation width of the secondary trajectory of 500 µm, and use a greater laser power, for example from 1000 to 2000 W, allowing a surface fusion rate of 3000 to 6000 cm$^2$/min and a specific surface productivity which is thus improved by a ratio of 5 to 10.

The invention claimed is:

1. An apparatus for manufacturing a three-dimensional object by selective additive manufacturing, the apparatus comprising:
    a support suitable for supporting at least one layer of additive manufacturing powder;
    a laser source suitable for emitting a laser beam;
    a scanning device suitable for directing the laser beam onto the at least one layer of additive manufacturing powder so as to scan at least a portion of the at least one layer, comprising at least one scanning mirror; and
    a modulating device for modulating a scanning trajectory, arranged upstream of the scanning device, the modulating device comprising a modulating mirror suitable for reflecting the laser beam emitted by the laser source and directing it directly toward the at least one scanning mirror, an angle of incidence of the laser beam emitted by the laser source on the modulating mirror being between 20 and 45°,
    wherein the modulating device is suitable for modifying an orientation of the modulating mirror with respect to a first modulation rotational axis or a second modulation rotational axis.

2. The apparatus according to claim 1, wherein the scanning device comprises a first scanning mirror or a second scanning mirror, the scanning device being suitable for modifying an orientation of the first scanning mirror with respect to a first scanning rotational axis or of the second scanning mirror with respect to a second scanning rotational axis.

3. The apparatus according to claim 2, wherein the scanning device is suitable for modifying the orientation of the first scanning mirror with respect to the first scanning rotational axis over a first range of scanning angle values, or of the second scanning mirror with respect to the second scanning rotational axis over a second range of scanning angle values, and
    wherein the modulating device is suitable for modifying the orientation of the modulating mirror with respect to the first modulation rotational axis over a first range of modulation angle values or the second modulation rotational axis over a second range of modulation angle values, the first or the second range of scanning angle values being wider than the first or second range of modulation angle values.

4. The apparatus according to claim 2, wherein the scanning device is configured for modifying the orientation of the first scanning mirror with respect to the first scanning rotational axis or of the second scanning mirror with respect to the second scanning rotational axis, at a scanning rotational speed, and wherein the modulating device is configured for modifying the orientation of the modulating mirror with respect to the first modulation rotational axis or the second modulation rotational axis, at a modulation rotational speed, the scanning rotational speed being lower than the modulation rotational speed.

5. The apparatus according to claim 1, wherein the scanning device comprises a first scanning mirror and a second scanning mirror, the first scanning mirror being suitable for reflecting the laser beam output from the modulating mirror and directing it toward the second scanning mirror, the second scanning mirror being suitable for reflecting the laser beam output from the first scanning mirror and directing it toward the at least one layer of additive manufacturing powder, thereby controlling an orientation of the first scanning mirror with respect to a first scanning rotational axis and of the second mirror with respect to a second scanning rotational axis, in order to control the scanning trajectory of the at least one layer by the laser beam in two degrees of freedom in a plane of the at least one layer.

6. The apparatus according to claim 1, wherein the modulating device is suitable for modulating the scanning trajectory according to a modulation comprising an oscillation at a frequency greater than 1.5 kHz.

7. The apparatus according to claim 1, wherein the angle of incidence of the laser beam emitted by the laser source on the modulating mirror is between 25 and 35°.

8. The apparatus according to claim 1, wherein the modulating mirror comprises silicon carbide.

9. The apparatus according to claim 1, wherein the modulating mirror is an elliptical mirror.

10. A method for manufacturing a three-dimensional object by selective additive manufacturing, implemented by means of an apparatus for manufacturing a three-dimensional object by selective additive manufacturing, the apparatus comprising a support suitable for supporting at least one layer of additive manufacturing powder, a laser source suitable for emitting a laser beam, a scanning device suitable for directing the laser beam onto the powder layer so as to scan at least a portion of the powder layer, the scanning device comprising at least one scanning mirror, a modulating device for modulating a scanning trajectory, arranged upstream of the scanning device, the modulating device comprising a modulating mirror suitable for reflecting the laser beam emitted by the laser source and directing it directly towards the at least one scanning mirror, an angle of incidence of the laser beam emitted by the laser source on the modulating mirror being between 20 and 45°, and the modulating device being suitable for modifying an orientation of the modulating mirror with respect to a first modulation rotational axis or a second modulation rotational axis, the method comprising the following steps:

controlling the scanning device of the apparatus after scanning at least a part of a layer of additive manufacturing powder along a scanning trajectory; and concurrently with controlling the scanning device, controlling the modulating device of the apparatus after modulating the scanning trajectory, such that the laser beam follows a modulated scanning trajectory at a level of the at least one layer of additive manufacturing powder, wherein, in the step of controlling the modulating device, the modulating device is controlled so as to modify the orientation of the modulating mirror with respect to the first or second modulation rotational axis at a modulation rotational speed.

11. The method according to claim 10, wherein, in the step of controlling scanning device, the scanning device is controlled so as to modify an orientation of a first scanning mirror with respect to a first scanning rotational axis or of a second scanning mirror with respect to a second scanning rotational axis, at a scanning rotational speed which is lower than the modulation rotational speed.

12. The apparatus according to claim 1, wherein the modulating device is suitable for modulating the scanning trajectory according to a modulation comprising an oscillation at a frequency greater than or equal to 10 kHz.

13. The apparatus according to claim 1, wherein the modulating mirror is suitable for oscillating simultaneously with first oscillations with respect to the first modulation rotational axis and with second oscillations with respect to the second modulation rotational axis.

14. The apparatus according to claim 13, wherein the first oscillations with respect to the first modulation rotational axis and the second oscillations with respect to the second rotational axis are independently controlled in amplitude and/or frequency.

15. The apparatus according to claim 13, wherein the first oscillations with respect to the first modulation rotational axis are controlled so as to have a phase offset relative to the second oscillations with respect to the second rotational axis.

16. The apparatus according to claim 14, wherein the first oscillations with respect to the first modulation rotational axis are controlled so as to have a phase offset relative to the second oscillations with respect to the second rotational axis.

* * * * *